United States Patent
Ueda et al.

(10) Patent No.: US 10,529,958 B2
(45) Date of Patent: Jan. 7, 2020

(54) BATTERY PACKAGING MATERIAL

(71) Applicant: DAI NIPPON PRINTING CO., LTD., Tokyo (JP)

(72) Inventors: Shunsuke Ueda, Tokyo (JP); Rikiya Yamashita, Tokyo (JP); Yohei Hashimoto, Tokyo (JP); Yaichiro Hori, Tokyo (JP)

(73) Assignee: DAI NIPPON PRINTING CO., LTD., Tokyo (JP)

( * ) Notice: Subject to any disclaimer, the term of this patent is extended or adjusted under 35 U.S.C. 154(b) by 379 days.

(21) Appl. No.: 15/122,799

(22) PCT Filed: Mar. 11, 2015

(86) PCT No.: PCT/JP2015/057110
§ 371 (c)(1),
(2) Date: Aug. 31, 2016

(87) PCT Pub. No.: WO2015/137378
PCT Pub. Date: Sep. 17, 2015

(65) Prior Publication Data
US 2017/0092902 A1 Mar. 30, 2017

(30) Foreign Application Priority Data

Mar. 13, 2014 (JP) ................................. 2014-050191
Mar. 20, 2014 (JP) ................................. 2014-058813

(51) Int. Cl.
| | | |
|---|---|---|
| B32B 15/08 | (2006.01) | |
| H01M 2/08 | (2006.01) | |
| B65D 65/40 | (2006.01) | |
| B65D 85/68 | (2006.01) | |
| H01M 2/02 | (2006.01) | |
| H01M 10/42 | (2006.01) | |
| B32B 7/12 | (2006.01) | |
| H01M 10/0525 | (2010.01) | |

(52) U.S. Cl.
CPC ............. H01M 2/0287 (2013.01); B32B 7/12 (2013.01); B32B 15/08 (2013.01); B65D 65/40 (2013.01); B65D 85/68 (2013.01); H01M 2/0285 (2013.01); H01M 2/0295 (2013.01); H01M 2/08 (2013.01); H01M 10/0525 (2013.01); H01M 10/4221 (2013.01); B32B 2307/206 (2013.01); B32B 2307/4026 (2013.01); B32B 2553/00 (2013.01); B65D 2585/88 (2013.01)

(58) Field of Classification Search
None
See application file for complete search history.

(56) References Cited

U.S. PATENT DOCUMENTS

| | | | | |
|---|---|---|---|---|
| 2008/0286635 | A1* | 11/2008 | Seino | ........................ B32B 7/12 |
| | | | | 429/94 |
| 2012/0135301 | A1* | 5/2012 | Akita | .................. H01M 2/0212 |
| | | | | 429/185 |
| 2013/0260161 | A1* | 10/2013 | Nagae | ..................... B29C 55/28 |
| | | | | 428/480 |

FOREIGN PATENT DOCUMENTS

| | | |
|---|---|---|
| JP | 2002-245998 A | 8/2002 |
| JP | 2004-066769 A | 3/2004 |
| JP | 2008-287971 A | 11/2008 |
| JP | 2009-062095 A | 3/2009 |
| JP | 2011-054563 A | 3/2011 |
| JP | 2011-126086 A | 6/2011 |
| JP | 2012-033324 A | 2/2012 |
| JP | 2012-212544 A | 11/2012 |
| JP | 2013-222545 A | 10/2013 |
| JP | 2013-235719 A | 11/2013 |

OTHER PUBLICATIONS

Jun. 9, 2015 International Search Report issued in International Patent Application No. PCT/JP2015/057110.
Jan. 9, 2018 Office Action issued in Japanese Patent Application No. 2014-058813.

* cited by examiner

*Primary Examiner* — Sheeba Ahmed
(74) *Attorney, Agent, or Firm* — Oliff PLC

(57) ABSTRACT

A battery packaging material of a first aspect identifiable from the outside has exceptional moldability, insulating properties, and reduced external appearance defects and seal defects. A battery packaging material of the second aspect identifiable has post-molding concealment and adhesion properties, exceptional electrolyte resistance and surface insulating properties. The battery packaging material of the first aspect includes a laminate of at least a base material, adhesive, metal and sealant layers sequentially laminated, at least one of the base material and adhesive layers includes a dye. The battery packaging material of the second aspect includes a laminate of at least a decorative, base material, metal and sealant layers sequentially laminated; the decorative layer has at least a first and second decorative layers from the base material layer side. The decorative layer includes coloring and matting agents. The resin ratio is at least 60% by mass for the first and second decorative layers.

18 Claims, 2 Drawing Sheets

BATTERY PACKAGING MATERIAL

TECHNICAL FIELD

A first aspect of the present invention relates to a battery packaging material which has discriminability from the outside, is excellent in moldability and insulation quality, and has reduced external appearance defects and seal defects. A second aspect of the present invention relates to a battery packaging material which has designability or discriminability, and which is excellent in post-molding concealment property and adhesion, and also excellent in electrolytic solution resistance and surface insulation quality.

BACKGROUND ART

Various types of batteries have been developed heretofore, and in every battery, a packaging material is an essential member for sealing battery elements such as an electrode and an electrolyte. Metallic packaging materials have been often used heretofore for battery packaging.

On the other hand, in recent years, batteries have been required to be diversified in shape and to be thinned and lightened with improvement of performance of electric cars, hybrid electric cars, personal computers, cameras, mobile phones and so on. However, metallic battery packaging materials that have often been heretofore used have the disadvantage that it is difficult to keep up with diversification in shape, and there is a limit on weight reduction.

Thus, in recent years, there has been proposed a film-shaped laminate with a base material, an adhesive layer, a metal layer and a sealant layer laminated in this order as a battery packaging material which is easily processed into diversified shapes and is capable of achieving thickness reduction and weight reduction (see Patent Document 2). In a process for producing a battery using such a battery packaging material, a label showing battery product information etc. may be attached to a surface of the battery packaging material, or instead of using a label, product information etc. may be directly printed on a surface of the battery packaging material with ink jets.

However, there is the problem that if by means of the label or printing, a discrimination mark identical to that of a regular maker is attached to a battery forged by a maker different from the regular maker, it is difficult to distinguish between the regular product and the forged product.

As a method for solving such a problem, for example, Patent Document 1 discloses an electrochemical cell packaging material including a multilayer film having a structure in which a base material layer, an adhesive agent layer, a metal foil layer and a heat-bondable resin layer are laminated in this order, the base material layer or adhesive agent layer containing a pigment as a discrimination mark. According to the method described in Patent Document 1, an electrochemical cell packaging material having a discrimination mark is obtained which is discriminable from the outside and hard to be forged.

A film-shaped battery packaging material as in Patent Document 2 is formed in such a manner that a battery element can be sealed by heat-welding the peripheral edge of the sealant layers by heat sealing with the sealant layers facing each other.

Nowadays, in view of prevention of forgery, etc., it may be required to impart designability, discriminability or the like to the external appearance of a battery, and decorativeness may be imparted by blending a pigment etc. in a layer situated on the outermost layer of a battery packaging material. For example, Patent Document 3 discloses a lithium ion secondary battery outer packaging material in which at least a first adhesive layer, a metal foil layer, a second adhesive layer and a sealant layer are laminated in this order on one surface of a base material layer, and the other surface of the base material layer is provided with a discrimination layer that is a resin layer with a glossiness of 3.0 or less for discrimination, the discrimination layer containing a pigment for discrimination, the pigment including particles covered with a resin, the pigment having a volume resistivity of $5 \times 10^{-2}$ Ω·m or more.

PRIOR ART DOCUMENTS

Patent Documents

Patent Document 1: Japanese Patent Laid-open Publication No. 2011-54563
Patent Document 2: Japanese Patent Laid-open Publication No. 2008-287971
Patent Document 3: Japanese Patent Laid-open Publication No. 2013-235719

SUMMARY OF THE INVENTION

Problems to be Solved by the Invention

When a battery is produced using an electrochemical cell packaging material having discriminability from the outside as disclosed in Patent Document 1, it is possible to distinguish between a regular battery product and a forged battery product as described above. However, the present inventors have made a diligent study repeatedly to reveal that when a discrimination mark is formed by incorporating a pigment in a resin that forms a base material layer etc. as in Patent Document 1, there are cases where the pigment is detached from the resin during molding of a battery packaging material because the pigment includes solid particles, and pinholes are generated at portions in which the pigment is detached. When a pigment is added to an adhesive layer interposed between a base material layer and a metal foil layer, the adhesive layer contains solid particles. Accordingly, the adhesiveness of the adhesive layer may be deteriorated, leading to occurrence of delamination. Further, it has been revealed that in such a case, deep molding of a battery packaging material may cause floating and deterioration of color tones at, for example, molding corner portions where the battery packaging material is largely extended.

Particularly, nowadays, battery packaging materials are required to be further thinned, and therefore pinholes are more easily generated during molding. Generation of pinholes in a battery packaging material causes the problem that the insulation quality of the battery packaging material is deteriorated. Further, there is the problem that a pigment contained in a resin may fall off in a process for producing a battery packaging material or a battery, and accordingly, external appearance defects of the battery packaging material, and seal defects resulting from sticking of a pigment to a seal portion easily occur.

Under these circumstances, a main object of a first aspect of the present invention is to provide a battery packaging material which has discriminability from the outside, is excellent in moldability and insulation quality, and has reduced external appearance defects and seal defects.

On the other hand, in a layer situated on the outermost layer of the battery packaging material, not only a pigment for imparting decorativeness such as designability or discriminability as described above, but also a resin having electrolytic solution resistance and containing a matting agent such as a filler may be used in view of electrolytic solution resistance of the battery surface. However, the present inventors have conducted studies to reveal that when in addition to a colorant such as a pigment including solid particles, a matting agent such as a filler is blended in a discrimination layer as disclosed in Patent Document 3, there is the problem that electrolytic solution resistance, and post-molding adhesion of the discrimination layer are deteriorated. On the other hand, when the blending ratio of a colorant such as a pigment, or a matting agent is decreased for suppressing deterioration of electrolytic solution resistance, the concealment property after molding of a battery packaging material is easily deteriorated.

Under these circumstances, a second aspect of the present invention is to provide a battery packaging material which has designability or discriminability, and which is excellent in post-molding concealment property and adhesion, and also excellent in electrolytic solution resistance and surface insulation quality.

Means for Solving the Problems

The present inventors have made a diligent study for solving the aforementioned problems of the first aspect of the present invention. Resultantly, the present inventors have found that when a battery packaging material includes a laminate in which at least a base material layer, an adhesive layer, a metal layer and a sealant layer are laminated in this order, and at least one of the base material layer and the adhesive layer contains a dye, the battery packaging material has discriminability from the outside, is excellent in moldability and insulation quality, and has reduced external appearance defects and seal defects. The first aspect of the present invention has been completed by further conducting studies based on the above-mentioned findings.

The present inventors made a diligent study for solving the aforementioned problem of the second aspect of the present invention. Resultantly, the present inventors have found that when a battery packaging material includes a laminate in which at least a decorative layer, a base material layer, a metal layer and a sealant layer are laminated in this order, the decorative layer includes at least a first decorative layer and a second decorative layer in this order from the base material layer side, the decorative layer contains a pigment and a matting agent, and the ratios of resins in the first decorative layer and the second decorative layer are each 60% by mass or more, the battery packaging material has designability or discriminability, and is excellent in post-molding concealment property and adhesion, and also excellent in electrolytic solution resistance and surface insulation quality. The second aspect of the present invention has been completed by further conducting studies based on the above-mentioned findings.

That is, the present invention provides a battery packaging material and a battery of the following aspects.

Item 1. A battery packaging material including a laminate in which at least a base material layer, an adhesive layer, a metal layer and a sealant layer are laminated in this order, wherein at least one of the base material layer and the adhesive layer contains a dye.

Item 2. The battery packaging material according to item 1, wherein a color from the dye forms a discrimination mark.

Item 3. The battery packaging material according to item 1 or 2, wherein the base material layer contains the dye.

Item 4. The battery packaging material according to any one of items 1 to 3, wherein the concentration of the dye in the base material layer is 1 to 50% by mass.

Item 5. The battery packaging material according to any one of items 1 to 4, wherein the dye is at least one selected from the group consisting of a nitro dye, an azo-based dye, a stilbene dye, a carbonium dye, a quinoline dye, a methine dye, a thiazole dye, a quineimine dye, an anthraquinone dye, an indigoid dye and a phthalocyanine dye.

Item 6. A battery packaging material including a laminate in which at least a decorative layer, a base material layer, a metal layer and a sealant layer are laminated in this order, wherein the decorative layer includes at least a first decorative layer and a second decorative layer in this order from the base material layer side, the decorative layer contains a colorant and a matting agent, and the ratios of resins in the first decorative layer and the second decorative layer are each 60% by mass or more.

Item 7. The battery packaging material according to item 6, wherein the ratio of the matting agent in the first decorative layer is 1 to 30% by mass.

Item 8. The battery packaging material according to item 6 or 7, wherein the first decorative layer contains 1 to 30% by mass of a pigment as a colorant.

Item 9. The battery packaging material according to any one of items 6 to 8, wherein the ratio of the resin in the first decorative layer is 65% by mass or more.

Item 10. The battery packaging material according to any one of items 6 to 9, wherein the ratio of the matting agent in the second decorative layer is 1 to 30% by mass.

Item 11. The battery packaging material according to any one of items 6 to 10, wherein the second decorative layer contains 1 to 30% by mass of a pigment as a colorant.

Item 12. The battery packaging material according to any one of items 6 to 11, wherein the ratio of the resin in the second decorative layer is 65% by mass or more.

Item 13. The battery packaging material according to any one of items 6 to 12, wherein the resin that forms the decorative layer is a two-liquid curable resin.

Item 14. The battery packaging material according to any one of items 6 to 13, wherein the colorant is a black pigment.

Item 15. The battery packaging material according to any one of items 1 to 14, wherein the metal layer is formed of an aluminum foil.

Item 16. The battery packaging material according to any one of items 1 to 15, which is a packaging material for a secondary battery.

Item 17. A battery, wherein a battery element including at least a positive electrode, a negative electrode and an electrolyte is stored in the battery packaging material according to any one of items 1 to 16.

Advantages of the Invention

According to the first aspect of the present invention, there can be provided a battery packaging material which has discriminability from the outside, is excellent in moldability and insulation quality, and has reduced external appearance defects and seal defects. Further, according to the first aspect of the present invention, by using the battery packaging material in a battery, there can be provided a battery which is excellent in insulation quality, has reduced external appearance defects and seal defects, and is discriminable from a forged product from the outside.

According to the second aspect of the present invention, there can be provided a battery packaging material which has designability or discriminability, and which is excellent in post-molding concealment property and adhesion, and also excellent in electrolytic solution resistance and surface insulation quality. According to the second aspect of the present invention, there can be provided a battery produced using the battery packaging material.

EMBODIMENTS OF THE INVENTION

A battery packaging material according to a first aspect of the present invention includes a laminate in which at least a base material layer, an adhesive layer, a metal layer and a sealant layer are laminated in this order, wherein at least one of the base material layer and the adhesive layer contains a dye. Hereinafter, the battery packaging material according to the first aspect of the present invention will be described in detail.

A battery packaging material according to a second aspect of the present invention includes a laminate in which at least a decorative layer, a base material layer, a metal layer and a sealant layer are laminated in this order, wherein the decorative layer includes at least a first decorative layer and a second decorative layer in this order from the base material layer side, the decorative layer contains a colorant and a matting agent, and the ratios of resins in the first decorative layer and the second decorative layer are each 60% by mass or more. Hereinafter, the battery packaging material according to the second aspect of the present invention will be described in detail.

Figure 1:
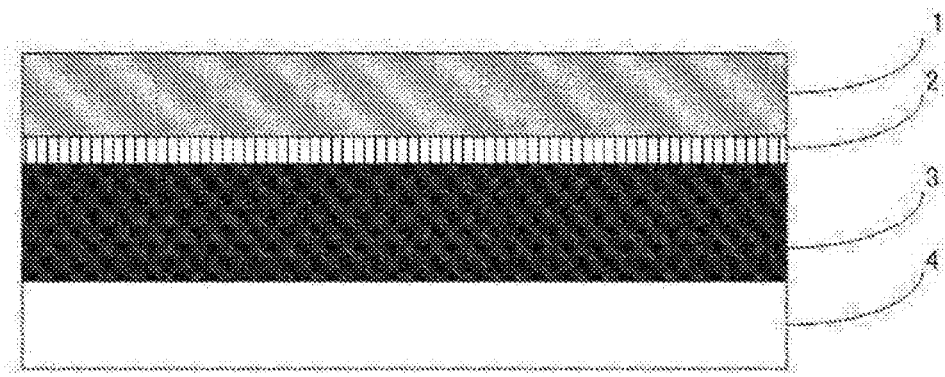
FIG. 1 is a drawing showing one example of a cross-sectional structure of a battery packaging material according to a first aspect of the present invention.

1. Laminated Structure of Battery Packaging Material (1-1) Battery Packaging Material of First Aspect of Invention The battery packaging material according to the first aspect of the present invention includes a laminate in which at least a base material layer 1, an adhesive layer 2, a metal layer 3 and a sealant layer 4 are laminated in this order as shown in FIG. 1. In the battery packaging material according to the first aspect of the present invention, the base material layer 1 is an outermost layer, and the sealant layer 4 is an innermost layer. That is, at the time of assembling a battery, the sealant layers 4 situated on the periphery of a battery element are heat-welded to each other to hermetically seal the battery element, so that the battery element is encapsulated.

Figure 2:
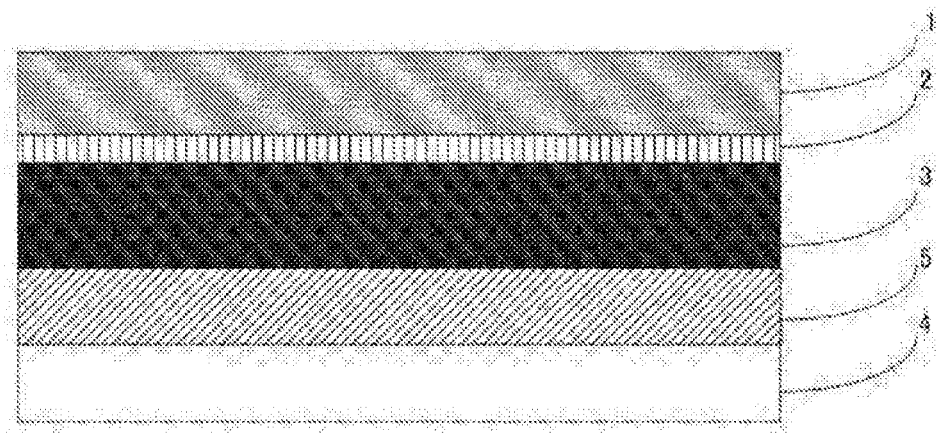
FIG. 2 is a drawing showing one example of a cross-sectional structure of the battery packaging material according to the first aspect of the present invention.

As shown in FIG. 2, the battery packaging material according to the first aspect of the present invention may be provided with an adhesive layer 5 between the metal layer 3 and the sealant layer 4 as necessary in order to improve adhesiveness of these layers.

(1-2) Battery Packaging Material of Second Aspect of Invention

Figure 3:
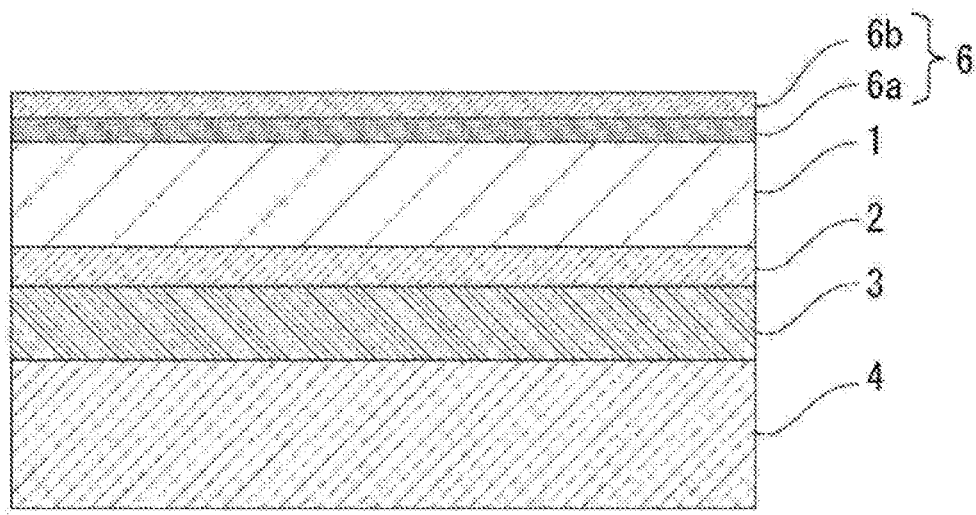
FIG. 3 is a drawing showing one example of a cross-sectional structure of a battery packaging material according to a second aspect of the present invention.

The battery packaging material according to the second aspect of the present invention includes a laminate in which at least a decorative layer 6, a base material layer 1, a metal layer 3 and a sealant layer 4 are laminated in this order as shown in FIG. 3. The decorative layer 6 includes at least a first decorative layer 6a and a second decorative layer 6b in this order from the base material layer 1 side. In the battery packaging material according to the present invention, the decorative layer 6 is an outermost layer, and the sealant layer 4 is an innermost layer. That is, at the time of assembling a battery, the sealant layers 4 situated on the periphery of a battery element are heat-welded to each other to hermetically seal the battery element, so that the battery element is encapsulated.

Figure 4:
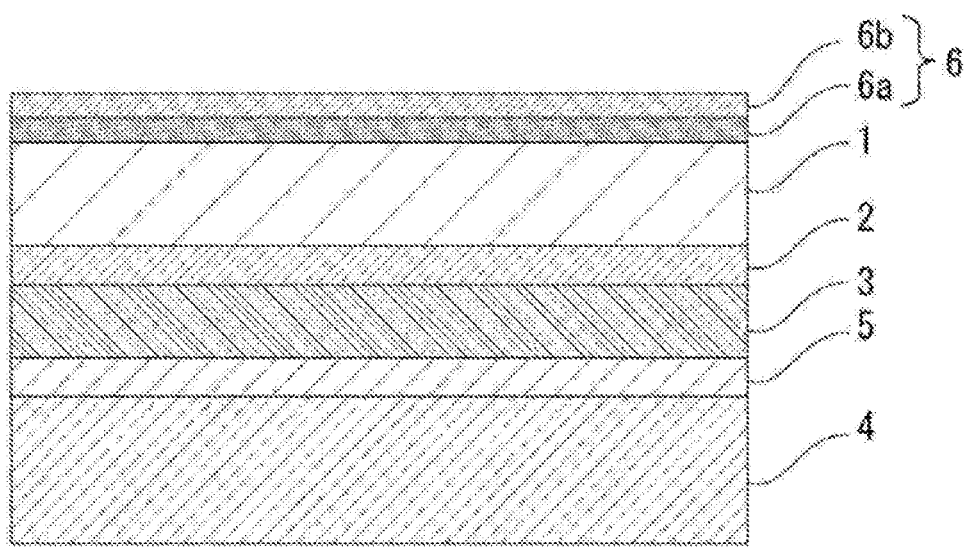
FIG. 4 is a drawing showing one example of a cross-sectional structure of the battery packaging material according to the second aspect of the present invention.

As shown in FIG. 3, the battery packaging material according to the present invention may be provided with an adhesive layer 2 between the base material layer 1 and the metal layer 3 as necessary in order to improve adhesiveness of these layers. As shown in FIG. 4, an adhesive layer 5 may be provided between the metal layer 3 and the sealant layer 4 as necessary in order to improve adhesiveness of these layers.

2. Composition of Each Layer Forming Battery Packaging Material (2-1) Battery Packaging Material of First Aspect of Invention

[Base Material Layer 1]

In the battery packaging material according to the first aspect of the present invention, the base material layer 1 is a layer that forms the outermost layer. In the first aspect of the present invention, at least one of the base material layer 1 and the later-described adhesive layer 2 contains a dye. The dye is not particularly limited as long as it can be dissolved/dispersed in the later-described material that forms the base material layer 1 or the adhesive layer 2, and examples thereof include nitro dyes, azo-based dyes, stilbene dyes, carbonium dyes, quinoline dyes, methine dyes, thiazole dyes, quineimine dyes, anthraquinone dyes, indigoid dyes and phthalocyanine dyes. Azo dyes, carbonium dyes, anthraquinone dyes and so on are preferred. Among them, azo dyes, anthraquinone dyes and so on are more preferred for further improving discriminability from the outside, moldability and an insulation quality for the battery packaging material according to the first aspect of the present invention. The dyes may be used alone, or may be used in combination of two or more thereof.

When the base material layer 1 contains a dye, the concentration of the dye in the base material layer 1 is not particularly limited as long as discriminability from the outside can be imparted to the battery packaging material, but it is preferably about 1 to 50% by mass, more preferably about 2 to 4% by mass, further preferably about 3 to 30% by mass. When the base material layer 1 has multiple layers as described later, the concentration is the dye concentration of a layer containing a dye.

In the first aspect of the present invention, at least one of the base material layer 1 and the later-described adhesive layer 2 contains a dye, and therefore has discriminability from the outside. Specifically, the dye contained in at least one of the base material layer 1 and the later-described adhesive layer 2 colors these layers, and therefore the battery packaging material can be discriminated from the outside by the color. In other words, in the first aspect of the present invention, the color from the dye forms a discrimination mark. Accordingly, even if a label or printing with a forged discrimination mark is attached or provided to the battery packaging material, whether a product (a battery packaging material or a battery produced using the battery packaging material) is genuine or false can be easily determined by a color difference recognizable from the external appearance of the battery packaging material.

For example, when a discrimination mark is formed by coloring with a pigment, addition of a pigment in the base material layer hinders a change in shape (extension) of the base material layer during molding of the battery packaging material because the pigment includes solid particles, and pinholes may be partially generated to deteriorate an insulation quality. When a pigment is added to the adhesive layer, adhesiveness may be deteriorated by solid particles to cause delamination. The pigment may fall off in a process for producing a battery packaging material, or during a process for producing a battery or during storage of a battery, so that the fallen-off pigment easily sticks to a surface of the battery packaging material to cause external appearance defects, and the pigment easily sticks to a seal portion to cause seal defects. On the other hand, in the battery packaging material according to the first aspect of the present invention, these problems that are caused by solid particles are unlikely to occur because a dye as described above is used for coloring of the base material layer 1 and the adhesive layer 2. Accordingly, the battery packaging material according to the first aspect of the present invention has excellent discriminability from the outside, is excellent in moldability and insulation quality, and has reduced external appearance defects and seal defects.

The material that forms the base material layer 1 is not particularly limited as long as it has an insulation quality, and is capable of dissolving/dispersing the dye. Examples of the material that forms the base material layer 1 include polyester resins, polyamide resins, epoxy resins, acrylic resins, fluororesins, polyurethane resins, silicon resins, phenol resins and resins (resin films) of, for example, mixtures and copolymers thereof. Among them, polyester resins and polyamide resins are preferred, and biaxially stretched polyester resins and biaxially stretched polyamide resins are more preferred. Specific examples of the polyester resin include polyethylene terephthalate, polybutylene terephthalate, polyethylene naphthalate, polybutylene naphthalate, copolymerized polyesters and polycarbonate. Specific examples of the polyamide resin include nylon 6, nylon 6,6, copolymers of nylon 6 and nylon 6,6, nylon 6,10 and polymethaxylylene adipamide (MXD6).

The base material layer 1 may be a single layer, or may have multiple layers. When the base material layer 1 has multiple layers, the layers can be laminated with, for example, an adhesive agent or an adhesive resin interposed between adjacent layers, and as a lamination method, a dry lamination method, a coextrusion method or the like can be employed. The kind, amount and the like of the adhesive agent used are the same as those in the case of the later-described adhesive layer 2 or adhesive layer 5.

The thickness of the base material layer 1 is not particularly limited, and it is, for example, about 5 to 30 µm, preferably about 7 to 25 µm.

[Adhesive Layer 2]

In the battery packaging material according to the first aspect of the present invention, the adhesive layer 2 is a layer provided between the base material layer 1 and the metal layer 3 for strongly bonding these layers to each other. The adhesive layer 2 is formed from an adhesive agent capable of bonding the base material layer 1 and the metal layer 3. Further, in the first aspect of the present invention, at least one of the base material layer 1 and the adhesive layer 2 contains a dye as described above. When the adhesive layer 2 contains a dye, the concentration of the dye in the adhesive layer 2 is not particularly limited as long as discriminability from the outside can be imparted to the battery packaging material, but it is preferably about 1 to 50% by mass, more preferably about 2 to 40% by mass, further preferably about 3 to 30% by mass. When the adhesive layer 2 has multiple layers as described later, the concentration is the dye concentration of a layer containing a dye.

The adhesive agent used for forming the adhesive layer 2 may be a two-liquid curable adhesive agent, or may be a one-liquid curable adhesive agent. Further, the bonding mechanism of the adhesive agent used for forming the adhesive layer 2 is not particularly limited, and may be any one of a chemical reaction type, a solvent volatilization type, a heat melting type, a heat pressing type and so on.

Specific examples of the resin component of the adhesive agent that can be used for forming the adhesive layer 2 include polyester-based resins such as polyethylene terephthalate, polybutylene terephthalate, polyethylene naphthalate, polybutylene naphthalate, polyethylene isophthalate, polycarbonate and copolymerized polyesters; polyether-based adhesive agents; polyurethane-based adhesive agents; epoxy-based resins; phenol resin-based resins; polyamide-based resins such as nylon 6, nylon 66, nylon 12 and copolymerized polyamides; polyolefin-based resins such as polyolefins, acid-modified polyolefins and metal-modified polyolefins; polyvinyl acetate-based resins; cellulose-based adhesive agents; (meth)acryl-based resins; polyimide-based resins; amino resins such as urea resins and melamine resins; rubbers such as chloroprene rubber, nitrile rubber and styrene-butadiene rubber; silicone-based resins; and ethylene fluoride-propylene copolymers. These adhesive agent components may be used alone, or may be used in combination of two or more thereof. The combination form of two or more adhesive agent components is not particularly limited, and examples of the adhesive agent components include mixed resins of polyamides and acid-modified polyolefins, mixed resins of polyamides and metal-modified polyolefins, mixed resins of polyamides and polyesters, mixed resins of polyesters and acid-modified polyolefins, and mixed resins of polyesters and metal-modified polyolefins. Among them, polyurethane-based two-liquid curable adhesive agents; and polyamides, polyesters or blend resins of these resins and modified polyolefins are preferred because they are excellent in spreadability, durability and a transformation inhibition action under high-humidity conditions, a thermal degradation inhibition action during heat-sealing, and so on, and effectively suppress occurrence of delamination by inhibiting a reduction in lamination strength between the base material layer 1 and the metal layer 3.

The adhesive layer 2 may be made multilayered with different adhesive agent components. When the adhesive layer 2 is made multilayered with different adhesive agent components, it is preferred that a resin excellent in adhesiveness with the base material layer 1 is selected as an adhesive agent component to be disposed on the base material layer 1 side, and an adhesive agent component excellent in adhesiveness with the metal layer 3 is selected as an adhesive agent component to be disposed on the metal layer 3 side for improving the lamination strength between the base material layer 1 and the metal layer 3. When the adhesive layer 2 is made multilayered with different adhesive agent components, specific examples of the preferred adhesive agent component to be disposed on the metal layer 3 side include acid-modified polyolefins, metal-modified polyolefins, mixed resins of polyesters and acid-modified polyolefins, and resins containing a copolymerized polyester.

The thickness of the adhesive layer 2 is, for example, 2 to 50 μm, preferably 3 to 25 μm.

[Metal Layer 3]

In the battery packaging material, the metal layer 3 is a layer that is intended to improve the strength of the battery packaging material, and also functions as a barrier layer for preventing ingress of water vapor, oxygen, light and the like into the battery. Specific examples of the metal forming the metal layer 3 include aluminum, stainless and titanium, with aluminum being preferred. The metal layer 3 can be formed from a metal foil or by metal deposition, and is preferably formed from a metal foil, more preferably from an aluminum foil. From the view point of preventing generation of wrinkles, pinholes and the like in the metal layer 3 during production of the battery packaging material, it is more preferred to form from soft aluminum foil such as annealed aluminum (JIS A8021P-O, JIS A8079P-O).

While the thickness of the metal layer 3 is not particularly limited, it can be, for example, about 10 μm to 200 μm, preferably about 20 μm to 100 μm.

Preferably, at least one surface, preferably both surfaces, of the metal layer 3 is subjected to a chemical conversion treatment for stabilization of bonding, prevention of dissolution and corrosion, and so on. Here, the chemical conversion treatment is a treatment for forming an acid resistance film on the surface of the metal layer. Examples of the chemical conversion treatment include a chromic acid chromate treatment using a chromic acid compound such as chromium nitrate, chromium fluoride, chromium sulfate, chromium acetate, chromium oxalate, chromium biphosphate, acetylacetate chromate, chromium chloride or chromium potassium sulfate; a phosphoric acid chromate treatment using a phosphoric acid compound such as sodium phosphate, potassium phosphate, ammonium phosphate or polyphosphoric acid; and a chromate treatment using an aminated phenol polymer having repeating units represented by the following general formulae (1) to (4). In the aminated phenol polymer, the repeating units represented by the following general formulae (1) to (4) may be contained alone, or may be contained in any combination of two or more thereof.

[Chemical Formula 1]

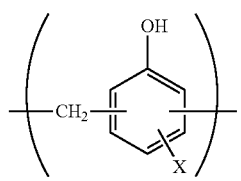

(1)

[Chemical Formula 2]

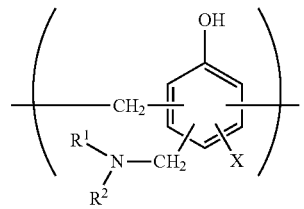

(2)

[Chemical Formula 3]

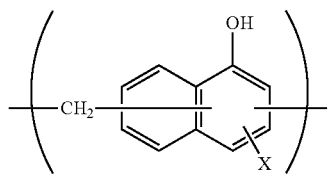

(3)

[Chemical Formula 4]

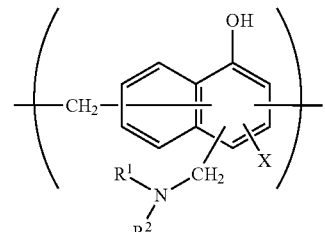

(4)

In the general formulae (1) to (4), X represents a hydrogen atom, a hydroxyl group, an alkyl group, a hydroxyalkyl group, an allyl group or a benzyl group. $R^1$ and $R^2$ are the same or different, and each represent a hydroxyl group, an alkyl group or a hydroxyalkyl group. In the general formulae (1) to (4), examples of the alkyl group represented by X, $R^1$ and $R^2$ include linear or branched alkyl groups with a carbon number of 1 to 4, such as a methyl group, an ethyl group, a n-propyl group, an isopropyl group, a n-butyl group, an isobutyl group and a tert-butyl group. Examples of the hydroxyalkyl group represented by X, $R^1$ and $R^2$ include linear or branched alkyl groups with a carbon number of 1 to 4, which is substituted with one hydroxy group, such as a hydroxymethyl group, a 1-hydroxyethyl group, a 2-hydroxyethyl group, a 1-hydroxypropyl group, a 2-hydroxypropyl group, a 3-hydroxypropyl group, a 1-hydroxybutyl group, a 2-hydroxybutyl group, a 3-hydroxybutyl group and a 4-hydroxybutyl group. In the general formulae (1) to (4), the alkyl group and the hydroxyalkyl group represented by X, $R^1$ and $R^2$ may be the same or different. In the general formulae (1) to (4), X is preferably a hydrogen atom, a hydroxyl group, or a hydroxyalkyl group. A number average molecular weight of the aminated phenol polymer having repeating units represented by the general formulae (1) to (4) is preferably 500 to 1000000, and more preferably about 1000 to 20000, for example.

Examples of the chemical conversion treatment method for imparting corrosion resistance to the metal layer 3 include a method in which the metal layer 3 is coated with a dispersion of fine particles of a metal oxide such as aluminum oxide, titanium oxide, cerium oxide or tin oxide or barium sulfate in phosphoric acid, and annealed at 150° C. or higher to form corrosion resistance treatment layer on the surface of the metal layer 3. A resin layer with a cationic polymer crosslinked with a crosslinking agent may be further formed on the corrosion resistance treatment layer. Here, examples of the cationic polymer include polyethyleneimine, ion polymer complexes formed of a polymer having polyethyleneimine and a carboxylic acid, primary amine-grafted acrylic resins obtained by graft-polymerizing a primary amine with an acrylic main backbone, polyallylamine or derivatives thereof, and aminophenol. These cationic polymers may be used alone, or may be used in combination of two or more thereof. Examples of the crosslinking agent include compounds having at least one functional group selected from the group consisting of an isocyanate group, a glycidyl group, a carboxyl group and an oxazoline group, and silane coupling agents. These crosslinking agents may be used alone, or may be used in combination of two or more thereof.

As for the chemical conversion treatment, only one chemical conversion treatment may be conducted, or combination of two or more chemical conversion treatments may be conducted. The chemical conversion treatments may be performed using one compound alone, or may be performed using two or more compounds in combination. Among chemical conversion treatments, a chromic acid chromate treatment, a chromate treatment using a chromic acid compound, a phosphoric acid compound and an aminated phenol polymer in combination, and so on are preferred.

The amount of the acid resistance film to be formed on the surface of the metal layer 3 in the chemical conversion treatment is not particularly limited, but for example, when the above-mentioned chromate treatment is performed, it is desirable that the chromic acid compound be contained in an amount of about 0.5 mg to about 50 mg, preferably about 1.0 mg to about 40 mg, in terms of chromium, the phosphorus compound be contained in an amount of about 0.5 mg to about 50 mg, preferably about 1.0 mg to about 40 mg, in terms of phosphorus, and the aminated phenol polymer be contained in an amount of about 1 mg to 200 mg, preferably about 5.0 mg to 150 mg, per 1 $m^2$ of the surface of the metal layer 3.

The chemical conversion treatment is performed in the following manner: a solution containing a compound to be used for formation of an acid resistance film is applied to the surface of the metal layer by a bar coating method, a roll coating method, a gravure coating method, an immersion method or the like, and heating is then performed so that the temperature of the metal layer is about 70° C. to 200° C. The metal layer may be subjected to a degreasing treatment by an alkali immersion method, an electrolytic cleaning method, an acid cleaning method, an electrolytic acid cleaning method or the like before the metal layer is subjected to a chemical conversion treatment. When a degreasing treatment is performed as described above, the chemical conversion treatment of the surface of the metal layer can be further efficiently performed.

[Sealant Layer 4]

In the battery packaging material according to the first aspect of the present invention, the sealant layer 4 corresponds to the innermost layer, and during assembly of a battery, the sealant layers are heat-welded to each other to hermetically seal the battery element.

The resin component to be used in the sealant layer 4 is not particularly limited as long as it can be heat-welded, and examples thereof include polyolefins, cyclic polyolefins, carboxylic acid-modified polyolefins and carboxylic acid-modified cyclic polyolefins.

Specific examples of the polyolefin include polyethylene such as low-density polyethylene, medium-density polyethylene, high-density polyethylene and linear low-density polyethylene; polypropylene such as homopolypropylene, block copolymers of polypropylene (e.g. block copolymers of propylene and ethylene) and random copolymers of polypropylene (e.g. random copolymers of propylene and ethylene); and terpolymers of ethylene-butene-propylene. Among these polyolefins, polyethylene and polypropylene are preferred.

The cyclic polyolefin is a copolymer of an olefin and a cyclic monomer, and examples of the olefin as a constituent monomer of the cyclic polyolefin include ethylene, propylene, 4-methyl-1-pentene, styrene, butadiene and isoprene. Examples of the cyclic monomer as a constituent monomer of the cyclic polyolefin include cyclic alkenes such as norbornene, specifically cyclic dienes such as cyclopentadiene, dicyclopentadiene, cyclohexadiene and norbornadiene. Among these polyolefins, cyclic alkenes are preferred, and norbornene is further preferred.

The carboxylic acid-modified polyolefin is a polymer with the polyolefin modified by subjecting the polyolefin to block polymerization or graft polymerization with a carboxylic acid. Examples of the carboxylic acid to be used for modification include maleic acid, acrylic acid, itaconic acid, crotonic acid, maleic anhydride and itaconic anhydride.

The carboxylic acid-modified cyclic polyolefin is a polymer obtained by performing copolymerization with an $\alpha,\beta$-unsaturated carboxylic acid or an anhydride thereof replacing a part of monomers that form the cyclic polyolefin, or by block-polymerizing or graft-polymerizing an $\alpha,\beta$-unsaturated carboxylic acid or an anhydride thereof with the cyclic polyolefin. The cyclic polyolefin to be modified with a carboxylic acid is the same as described above. The carboxylic acid to be used for modification is the same as those used for modification of the acid-modified cycloolefin copolymer.

Among these resin components, carboxylic acid-modified polyolefins are preferred, and carboxylic acid-modified polypropylene is further preferred.

The sealant layer 4 may be formed from one resin component alone, or may be formed from a blend polymer obtained by combining two or more resin components. Further, the sealant layer 4 may be formed of only one layer, but may be formed of two or more layers with the same resin component or different resin components.

The thickness of the sealant layer 4 may be appropriately selected, and it is 10 to 100 μm, preferably 15 to 50 nm.

[Adhesive Layer 5]

In the battery packaging material, the adhesive layer 5 may be further provided between the metal layer 3 and the sealant layer 4 for the purpose of, for example, firmly bonding the metal layer 3 and the sealant layer 4.

The adhesive layer 5 is formed from an adhesive agent component capable of bonding the metal layer 3 and the sealant layer 4 described later. The adhesive agent used for forming the adhesive layer 5 may be a two-liquid curable adhesive agent, or may be a one-liquid curable adhesive agent. Further, the bonding mechanism of the adhesive agent component used for forming the adhesive layer 5 is not particularly limited, and examples thereof include bonding mechanisms of a chemical reaction type, a solvent volatilization type, a heat melting type and a heat pressing type.

Specific examples of the adhesive agent component that can be used for forming the adhesive layer 5 include polyester-based resins such as polyethylene terephthalate, polybutylene terephthalate, polyethylene naphthalate, polybutylene naphthalate, polyethylene isophthalate, polycarbonate and copolymerized polyesters; polyether-based adhesive agents; polyurethane-based adhesive agents; epoxy-based resins; phenol resin-based resins; polyamide-based resins such as nylon 6, nylon 66, nylon 12 and copolymerized polyamides; polyolefin-based resins such as polyolefins, carboxylic acid-modified polyolefins and metal-modified polyolefins, polyvinyl acetate-based resins; cellulose-based adhesive agents; (meth)acryl-based resins; polyimide-based resins; amino resins such as urea resins and melamine resins; rubbers such as chloroprene rubber, nitrile rubber and styrene-butadiene rubber; and silicone-based resins. These adhesive agent components may be used alone, or two or more adhesive agent components may be used in combination.

While the thickness of the adhesive layer 5 is not particularly limited, it is preferably about 1 μm to 40 μm, more preferably about 2 μm to 30 μm, for example.

(2-2) Battery Packaging Material of Second Aspect of Invention

[Base Material Layer 1]

In the battery packaging material according to the second aspect of the present invention, the base material layer 1 is a layer as a base material, which is situated inside the decorative layer 6 situated on the outermost layer. The material that forms the base material layer 1 is not particularly limited as long as it has an insulation quality, and the material is the same as those of the base material layer 1 according to the first aspect of the present invention.

[Adhesive Layer 2]

In the battery packaging material according to the second aspect of the present invention, the adhesive layer 2 is a layer provided as necessary for bonding the base material layer 1 and the metal layer 3.

The adhesive layer 2 is formed from an adhesive agent capable of bonding the base material layer 1 and the metal layer 3. The adhesive agent used for forming the adhesive layer 2 may be a two-liquid curable adhesive agent, or may be a one-liquid curable adhesive agent. Further, the bonding mechanism of the adhesive agent used for forming the adhesive layer 2 is not particularly limited, and may be any one of a chemical reaction type, a solvent volatilization type, a heat melting type, a heat pressing type and so on.

The resin component of an adhesive agent that can be used for formation of the adhesive layer 2 may be, for example, one that is the same as those of the adhesive layer 2 in the first aspect of the present invention.

The adhesive layer 2 may be made multilayered with different adhesive agent components as in the case of the adhesive layer 2 in the first aspect of the present invention.

The thickness of the adhesive layer 2 is the same as the thickness of the adhesive layer 2 in the first aspect of the present invention.

[Metal Layer 3]

In the battery packaging material according to the second aspect of the present invention, the metal layer 3 is a layer which is intended to improve the strength of the packaging material, and also functions as a barrier layer for preventing ingress of water vapor, oxygen, light and the like into the battery. Thus, the metal layer 3 in the second aspect of the present invention is the same as the metal layer 3 in the first aspect of the present invention.

[Sealant Layer 4]

In the battery packaging material according to the second aspect of the present invention, the sealant layer 4 corresponds to the innermost layer, and during assembly of a battery, the sealant layers are heat-welded to each other to hermetically seal the battery element. Thus, the sealant layer 4 in the second aspect of the present invention is the same as the sealant layer 4 in the second aspect of the present invention.

[Decorative Layer 6]

In the battery packaging material according to the second aspect of the present invention, the decorative layer 6 is a layer that is provided for the purpose of imparting decorativeness such as designability or discriminability and imparting electrolytic solution resistance to the battery packaging material. The decorative layer 6 is situated on the outside (outermost layer) of the base material layer 1 when a battery is assembled.

The decorative layer 6 includes at least a first decorative layer 6a and a second decorative layer 6b in this order from the base material layer 1 side. The decorative layer 6 may include one or more decorative layers such as a third decorative layer 6c and a fourth decorative layer 6d outside the second decorative layer 6b or between the first decorative layer 6a and the second decorative layer 6b. In other words, when the decorative layer 6 further includes an additional decorative layer in addition to the first decorative layer 6a and the second decorative layer 6b, the additional decorative layer may be provided at any position outside the first decorative layer 6a.

In the battery packaging material according to the second aspect of the present invention, the decorative layer 6 contains a colorant and a matting agent, and the decorative layer 6 includes the first decorative layer 6a and the second decorative layer 6b. In the second aspect of the present invention, the decorative layer 6 has such a configuration, and thus there can be provided a battery packaging material which is excellent in post-molding concealment property and adhesion, and also excellent in electrolytic solution resistance and surface insulation quality. In other words, the battery packaging material has a high post-molding concealment property because the decorative layer 6 contains a colorant, and the battery packaging material has high electrolytic solution resistance because the decorative layer 6 contains a matting agent. Further, the ratios of resins in the first decorative layer 6a and the second decorative layer 6b are each set to 60% by mass or more to effectively improve adhesion after molding, and electrolytic solution resistance. For further improving the concealment property, adhesion, electrolytic solution resistance and surface insulation quality, it is preferable that the first decorative layer 6a is situated on the base material layer 1, and the second decorative layer 6b is situated on the outermost layer of the battery packaging material.

The colorant contained in the decorative layer 6 is not particularly limited as long as it can color the decorative layer 6, but pigments and dyes are preferred, and pigments are more preferred. The colorants may be used alone, or may be used in combination of two or more thereof.

The pigment is not particularly limited as long as it can impart decorativeness such as designability or discriminability to the battery packaging material, and examples thereof include black pigments. The black pigment is not particularly limited, but carbon black or the like is preferred. The pigments may be used alone, or may be used in combination of two or more thereof.

The particle size of the pigment is not particularly limited, but it is preferably about 1 nm to 20 μm. The particle size of the pigment means a value measured by a laser diffraction/scattering method.

Examples of the dye include nitro dyes, azo-based dyes, stilbene dyes, carbonium dyes, quinoline dyes, methine dyes, thiazole dyes, quineimine dyes, anthraquinone dyes, indigoid dyes and phthalocyanine dyes. The dyes may be used alone, or may be used in combination of two or more thereof.

The matting agent is not particularly limited as long as it can impart electrolytic solution resistance to the battery packaging material, and examples thereof include fine particles having a particle size of about 1 nm to 20 µm. The particle size of the matting agent means a value measured by a laser diffraction/scattering method.

The material of the matting agent (filler) is not particularly limited, and examples thereof include metals, metal oxides, inorganic substances and organic substances. The shape of the matting agent is not particularly limited, and examples thereof include a spherical shape, a fibrous shape, a plate shape, an amorphous shape and a balloon shape. Specific examples of the matting agent include talc, silica, kaolin, montmorilloide, montmorillonite, synthetic mica, hydrotalcite, silica gel, zeolite, aluminum hydroxide, magnesium hydroxide, zinc oxide, magnesium oxide, aluminum oxide, neodymium oxide, antimony oxide, titanium oxide, cerium oxide, calcium sulfate, barium sulfate, calcium carbonate, calcium silicate, lithium carbonate, calcium benzoate, calcium oxalate, magnesium stearate, alumina, high-melting-point nylons, crosslinked acrylics, crosslinked styrene, crosslinked polyethylene, benzoguanamine, gold, aluminum, copper, nickel, resin beads and colored resin beads. These matting agents may be used alone, or may be used in combination of two or more thereof. Among these matting agents, silica, barium sulfate and titanium oxide are preferred from the viewpoint of dispersion stability, costs and so on. The surface of the matting agent may be subjected to various kinds of surface treatments such as an insulation treatment and a dispersibility enhancing treatment.

When the first decorative layer 6a contains a pigment, the ratio of the pigment in the first decorative layer 6a is preferably about 1 to 30% by mass, more preferably about 5 to 25% by mass for further improving the concealment property, adhesion, electrolytic solution resistance and surface insulation quality. When the second decorative layer 6b contains a pigment, the ratio of the pigment in the second decorative layer 6b is preferably about 1 to 30% by mass, more preferably about 5 to 25% by mass from the same point of view as described above. In the second aspect of the present invention, the ratios of resins in the first decorative layer 6a and the second decorative layer 6b are each set to 60% by mass or more to effectively improve adhesion after molding, and electrolytic solution resistance even when the decorative layer 6 contains a pigment and a matting agent as solid particles. Accordingly, the second aspect of the present invention is particularly effective for a decorated sheet including a pigment as a colorant.

When the first decorative layer 6a contains a matting agent, the ratio of the matting agent in the first decorative layer 6a is preferably about 1 to 30% by mass, more preferably about 5 to 15% by mass for further improving the concealment property, adhesion, electrolytic solution resistance and surface insulation quality. When the second decorative layer 6b contains a matting agent, the ratio of the matting agent in the second decorative layer 6b is preferably about 1 to 30% by mass, more preferably about 5 to 15% by mass from the same point of view as described above.

When a pigment is used as a colorant, the ratio of the pigment in the whole of the decorative layer 6 is preferably about 1 to 30% by mass, more preferably about 5 to 25% by mass. The ratio of the matting agent in the whole of the decorative layer 6 is preferably about 1 to 30% by mass, more preferably about 5 to 15% by mass.

The ratio of a resin in each of the first decorative layer 6a and the second decorative layer 6b is not particularly limited as long as it is 60% by mass or more, but it is preferably 65% by mass or more, more preferably about 70% by mass to 85% by mass for further improving the concealment property, adhesion, electrolytic solution resistance and surface insulation quality. Further, the ratio of a resin in the whole of the decorative layer 6 is preferably 60% by mass or more, more preferably 65% by mass or more, further preferably about 70% by mass to 85% by mass from the same point of view as described above.

The resin that forms the decorative layer 6 is not particularly limited, and examples thereof include two-liquid curable resins. The two-liquid curable resin is not particularly limited as long as it has electrolytic solution resistance, and examples thereof include two-liquid curable urethane resins, two-liquid curable acrylic resins, two-liquid curable polyester resins and two-liquid curable epoxy resins. The resins that form the decorative layer 6 may be used alone, or may be used in combination of two or more thereof.

Among these two-liquid curable resins, two-liquid curable urethane resins containing a polyol and an isocyanate-based curing agent are preferred as the resin that forms the decorative layer 6.

Specific examples of the polyol include polyester polyol, acryl polyol, polyether polyol and polyurethane polyol. Specific examples of the isocyanate-based curing agent include methylene diisocyanate, isopropylene diisocyanate, lysine diisocyanate, 2,2,4- or 2,4,4-trimethylhexamethylene diisocyanate, 1,6-hexamethylene diisocyanate, methylcyclohexane diisocyanate, isophorone diisocyanate, 4,4'-dicyclohexylmethane diisocyanate and isopropylidenedicyclohexyl-4,4'-diisocyanate. The isocyanate-based curing agent may be an adduct product, a biuret product, an isocyanurate product or the like of any of the above-mentioned isocyanate compounds.

The decorative layer 6 may contain additives such as a slipping agent, a flame retardant, an antioxidant, a light stabilizer, a tackifier, a leveling agent and a defoaming agent as necessary. The slipping agent is not particularly limited, and examples thereof include fatty acid amides, metal soaps, hydrophilic silicones, acrylics grafted with silicone, epoxies grafted with silicone, polyethers grafted with silicone, polyesters grafted with silicone, block silicone acrylic copolymers, polyglycerol-modified silicones and paraffins. These slipping agents may be used alone, or may be used in combination of two or more thereof.

The method for forming the decorative layer 6 is not particularly limited, and examples thereof include a method in which an ink containing a resin that forms the decorative layer 6, at least one of a colorant and a matting agent, a solvent, and so on is applied onto one surface of the base material layer 1, and printing is performed. In the case where a matting agent is blended, the matting agent may be added to and mixed with the two-liquid curable resin, followed by applying the mixture.

Preferably, the decorative layer 6 is formed thin to the extent that the decorative layer 6 can exhibit decorativeness and electrolytic solution resistance. The total thickness of the decorative layer 6 is preferably 10 µm or less, more preferably about 2 to 8 µm, further preferably about 3 to 6 µm. The thickness of the first decorative layer 6a is, for example, about 1 to 4 µm, preferably 2 to 3 µm. The thickness of the second decorative layer 6b is, for example, about 1 to 4 µm, preferably about 2 to 3 µm.

When the decorative layer 6 further includes an additional decorative layer such as the above-mentioned third decorative layer 6c, the ratios of a colorant, a matting agent, a resin and so on in the additional decorative layer may be the same as those in the first decorative layer 6a or the second decorative layer 6b. The same may apply to the thickness.

The battery packaging material is required to have a high insulation quality. In the battery packaging material according to the second aspect of the present invention, the surface resistance value of the decorative layer 6 situated on the outermost layer is, for example, $10^4$ Ω/sq or more, preferably $10^6$ Ω/sq or more. The surface resistance value of the decorative layer 6 of the battery packaging material according to the second aspect of the present invention is a value measured at 22° C. and a relative humidity of 40% using Hiresta UP "product name, manufactured by Mitsubishi Chemical Corporation."

[Adhesive Layer 5]

In the battery packaging material according to the second aspect of the present invention, the adhesive layer 5 is a layer that is provided between the metal layer 3 and the sealant layer 4 as necessary for strongly bonding these layers to each other.

The adhesive layer 5 is formed from an adhesive agent capable of bonding the metal layer 3 and the sealant layer 4 to each other. The bonding mechanism, the kind of the adhesive agent component, and so on for the adhesive agent to be used for formation of the adhesive layer 5 are the same as those for the adhesive layer 2. The adhesive agent component to be used in the adhesive layer 5 is preferably a polyolefin-based resin, further preferably a carboxylic acid-modified polyolefin, especially preferably carboxylic acid-modified polypropylene.

The thickness of the adhesive layer 5 is, for example, 2 to 50 μm, preferably 15 to 30 Mm.

3. Method for Producing Battery Packaging Material (3-1) Battery Packaging Material of First Aspect of Invention While the method for producing the battery packaging material of the first aspect of the present invention is not particularly limited as long as a laminate including layers each having predetermined composition is obtained, and for example, the following method is shown as an example.

First, a laminate in which the base material layer 1, the adhesive layer 2 and the metal layer 3 are laminated in this order (hereinafter, the laminate may be described as a "laminate A") is formed. Specifically, the laminate A can be formed by a dry lamination method in which an adhesive agent to be used for formation of the adhesive layer 2 is applied onto the base material layer 1 or the metal layer 3 the surface of which is subjected to a chemical conversion treatment as necessary, using a coating method such as an extrusion method, a gravure coating method or a roll coating method, and dried, the metal layer 3 or the base material layer 1 is then laminated, and the adhesive layer 2 is cured.

Then, the sealant layer 4 is laminated on the metal layer 3 of the laminate A. When the sealant layer 4 is laminated directly on the metal layer 3, a resin component that forms the sealant layer 4 may be applied onto the metal layer 3 of the laminate A by a method such as a gravure coating method or a roll coating method. When the adhesive layer 5 is provided between the metal layer 3 and the sealant layer 4, mentioned is provided, for example, by (1) a method in which the adhesive layer 5 and the sealant layer 4 are co-extruded to be laminated on the metal layer 3 of the laminate A (co-extrusion lamination method); (2) a method in which the adhesive layer 5 and the sealant layer 4 are laminated to form a laminate separately, and the laminate is laminated on the metal layer 3 of the laminate A by a thermal lamination method; (3) a method in which an adhesive agent for formation of the adhesive layer 5 is laminated on the metal layer 3 of the laminate A by, for example, a method of applying the adhesive agent onto the metal layer 3 with an extrusion method or solution coating, drying at a high temperature and baking, and the sealant layer 4 formed in a sheet shape beforehand is laminated on the adhesive layer 5 by a thermal lamination method; and (4) a method in which the melted adhesive layer 5 is poured between the metal layer 3 of the laminate A and the sealant layer 4 formed in a sheet shape beforehand, and simultaneously the laminate A and the sealant layer 4 are bonded together with the adhesive layer 5 interposed therebetween (sandwich lamination method).

A laminate including the base material layer 1, the adhesive layer 2, the metal layer 3 the surface of which is subjected to a chemical conversion treatment as necessary, the adhesive layer 5 provided as necessary and the sealant layer 4 is formed in the manner described above, and the laminate may be further subjected to a heating treatment such as that of a heat roll contact type, hot air type or near- or far-infrared ray type, for enhancing the adhesiveness of the adhesive layer 2, and the adhesive layer 5 provided as necessary. As conditions for such a heating treatment, for example, the temperature is 150 to 250° C., and the time is 1 to 5 minutes.

(3-2) Battery Packaging Material of Second Aspect of Invention

While the method for producing the battery packaging material of the second aspect of the present invention is not particularly limited as long as a laminate including layers each having predetermined composition is obtained, and for example, the following method is shown as an example.

First, a laminate in which the base material layer 1, the adhesive layer 2 and the metal layer 3 are laminated in this order (hereinafter, the laminate may be described as a "laminate A") is formed. Specifically, the laminate A can be formed by a dry lamination method in which an adhesive agent to be used for formation of the adhesive layer 2 is applied onto the base material layer 1 or the metal layer 3 the surface of which is subjected to a chemical conversion treatment as necessary, using a coating method such as an extrusion method, a gravure coating method or a roll coating method, and dried, the metal layer 3 or the base material layer 1 is then laminated, and the adhesive layer 2 is cured.

Then, the sealant layer 4 is laminated on the metal layer 3 of the laminate A. When the sealant layer 4 is laminated directly on the metal layer 3, a resin component that forms the sealant layer 4 may be applied onto the metal layer 3 of the laminate A by a method such as a gravure coating method or a roll coating method. When the adhesive layer 6 is provided between the metal layer 3 and the sealant layer 4, mentioned is provided, for example, by (1) a method in which the adhesive layer 6 and the sealant layer 4 are co-extruded to be laminated on the metal layer 3 of the laminate A (co-extrusion lamination method); (2) a method in which the adhesive layer 6 and the sealant layer 4 are laminated to form a laminate separately, and the laminate is laminated on the metal layer 3 of the laminate A by a thermal lamination method; (3) a method in which an adhesive agent for formation of the adhesive layer 6 is laminated on the metal layer 3 of the laminate A by, for example, a method of applying the adhesive agent onto the metal layer 3 with an extrusion method or solution coating, drying at a high temperature and baking, and the sealant layer 4 formed in a sheet shape beforehand is laminated on the adhesive layer 6 by a thermal lamination method; and (4) a method in which the melted adhesive layer 6 is poured between the metal layer 3 of the laminate A and the sealant layer 4 formed in a sheet shape beforehand, and simultaneously the laminate A and the sealant layer 4 are bonded together with the adhesive layer 6 interposed therebetween (sandwich lamination method).

Further, the decorative layer 6 is printed in the order of the first decorative layer 6a and the second decorative layer 6b on the base material layer 1 to form a laminate including the second decorative layer 6b, the first decorative layer 6a, the base material layer 1, the adhesive layer 2 provided as necessary, the metal layer 3 the surface of which is subjected to a chemical conversion treatment as necessary, the adhesive layer 6 provided as necessary and the sealant layer 4 is formed. The laminate may be further subjected to a heating treatment such as that of a heat roll contact type, hot air type or near- or far-infrared ray type, for enhancing the adhesiveness of the adhesive layer 2, and the adhesive layer 6 provided as necessary. As conditions for such a heating treatment, for example, the temperature is 150 to 250° C., and the time is 1 to 5 minutes.

In the battery packaging materials according to the first aspect and the second aspect of the present invention, the layers that form the laminate may be subjected to a surface activation treatment such as a corona treatment, a blast treatment, an oxidation treatment or an ozone treatment as necessary for improving or stabilizing film formability, lamination processing and final product secondary processing (pouching and embossing molding) suitability, and the like.

4. Use of Battery Packaging Material

The battery packaging materials according to the first aspect and the second aspect of the present invention are each used as a packaging material for hermetically sealing and storing battery elements such as a positive electrode, a negative electrode and an electrolyte.

Specifically, a battery element including at least a positive electrode, a negative electrode and an electrolyte is covered with the battery packaging material according to each of the first aspect and the second aspect of the present invention such that a flange portion (region where sealant layers are in contact with each other) can be formed on the periphery of the battery element while a metal terminal connected to each of the positive electrode and the negative electrode protrudes to the outside, and sealant layers at the flange portion are heat-sealed with each other for hermetical sealing, thereby providing a battery using a battery packaging material. When the battery element is stored using the battery packaging material according to each of the first aspect and the second aspect of the present invention, the battery packaging material according to each of the first aspect and the second aspect of the present invention is used such that the sealant portion is on the inner side (surface in contact with the battery element).

The battery packaging materials according to the first aspect and the second aspect of the present invention may be used for either a primary battery or a secondary battery, but is preferably used for a secondary battery. The type of the secondary battery to which the battery packaging materials according to the first aspect and the second aspect of the present invention are applied is not particularly limited, and examples thereof include lithium ion batteries, lithium ion polymer batteries, lead storage batteries, nickel-hydrogen storage batteries, nickel-cadmium storage batteries, nickel-iron storage batteries, nickel-zinc storage batteries, silver oxide-zinc storage batteries, metal-air batteries, polyvalent cation batteries, condensers and capacitors. Among these secondary batteries, preferred subjects to which the battery packaging materials according to the first aspect and the second aspect of the present invention are applied include lithium ion batteries and lithium ion polymer batteries. Since batteries according to the first aspect and the second aspect of the present invention are produced using the battery packaging materials according to the first aspect and the second aspect of the present invention, these batteries are excellent in insulation quality, have reduced external appearance defects and seal defects, and are discriminable from a forged product from the outside.

EXAMPLES

The first aspect and the second aspect of the present invention will be described in detail below by way of examples and comparative examples. It is to be noted that the first aspect and the second aspect of the present invention are not limited to the examples.

1-1. Production of Battery Packaging Material of First Aspect of Invention

Both surfaces of an aluminum foil (thickness: 40 µm) were subjected to a chemical conversion treatment, a polyethylene terephthalate (PET) film (thickness: 12 µm) was bonded to one of the chemical conversion-treated surfaces with a polyester-based adhesive agent interposed therebetween by a dry lamination method in such a manner that the thickness of a adhesive layer was about 4 µm, and acid-modified polypropylene (thickness: 23 µm) was melt-extruded and a sealant film composed of a polypropylene film (thickness: 23 µm) was laminated to the other chemical conversion-treated surface to obtain a battery packaging material including a PET film, a polyester-based adhesive agent, aluminum with both surfaces subjected to a chemical conversion treatment, acid-modified polypropylene and a polypropylene film. The PET film used in Example 1A contains 20% by mass of p-phenylazophenol as a coloring dye. The PET film used in Comparative Example 1A does not contain a coloring dye, and contains 10% by mass of titanium oxide as a coloring pigment. Further, in Comparative Example 2A, the PET film does not contain a colorant, and the adhesive agent contains 10% by mass of titanium oxide as a coloring pigment.

The chemical conversion treatment of the aluminum foil was performed in the following manner: an aqueous solution including a phenol resin, a chromium fluoride compound and phosphoric acid was applied as a treatment liquid using a roll coating method, and baked under the condition of a film temperature of 180° C. or higher. The applied amount of chromium was 10 mg/m$^2$ (dry weight).

[Evaluation of Moldability]

The battery packaging material prepared in each of Example 1A and Comparative Examples 1A and 2A was cut to prepare a strip piece of 120×80 mm, a straight mold including a rectangular male mold of 55×32 mm and a female mold with a clearance of 0.3 mm from the male mold (male mold corner R: 2 mm and ridge R: 1 mm) was provided, the strip piece was placed on the female mold in such a manner that a thermally bondable resin layer was situated on the male mold side, the strip piece was pressed at a pressing pressure (surface pressure) of 0.16 MPa, and molding was performed at intervals of 0.1 mm in a depth between 3.0 mm and 4.0 mm to prepare a molded container (tray) including a rectangular concave of 55×32 mm and a flange portion on the four peripheral edges of the concave. Presence/absence of pinholes in the molded container was evaluated. The results are shown in Table 1A. In Table 1A, samples having no pinholes are rated as "○", and samples having pinholes are rated as "x".

[Evaluation of Dielectric Breakdown Voltage]

Molded containers prepared in the above-mentioned evaluation of moldability were prepared separately, and the dielectric breakdown voltage of the molded corner portion was evaluated using a dielectric breakdown test apparatus (YST-243-100RHO manufactured by YAMAYOSHIKENKI COM.). The results are shown in Table 1A.

TABLE 1A

|  | Molding depth (mm) | Pinholes | Dielectric breakdown voltage (kV) |
|---|---|---|---|
| Example 1A | 3.0 | ○ | 6.1 |
|  | 3.1 | ○ | 6.2 |
|  | 3.2 | ○ | 6.3 |
|  | 3.3 | ○ | 6.2 |
|  | 3.4 | ○ | 6.1 |
|  | 3.5 | ○ | 6.2 |
|  | 3.6 | ○ | 6.2 |
|  | 3.7 | ○ | 6.1 |
|  | 3.8 | ○ | 5.3 |
|  | 3.9 | x | 4.2 |
|  | 4.0 | x | 4.3 |
| Comparative Example 1A | 3.0 | ○ | 6.2 |
|  | 3.1 | ○ | 6.1 |
|  | 3.2 | ○ | 5.5 |
|  | 3.3 | x | 4.7 |
|  | 3.4 | x | 4.1 |
|  | 3.5 | x | 4.2 |
|  | 3.6 | x | 4.2 |
|  | 3.7 | x | 4.2 |
|  | 3.8 | x | 4.0 |
|  | 3.9 | x | 4.1 |
|  | 4.0 | x | 4.1 |
| Comparative Example 2A | 3.0 | ○ | 6.2 |
|  | 3.1 | ○ | 6.1 |
|  | 3.2 | ○ | 6.2 |
|  | 3.3 | ○ | 4.5 |
|  | 3.4 | ○ | 4.1 |
|  | 3.5 | x | 4.3 |
|  | 3.6 | x | 4.2 |
|  | 3.7 | x | 4.3 |
|  | 3.8 | x | 4.2 |
|  | 3.9 | x | 4.1 |
|  | 4.0 | x | 4.3 |

As is evident from the results shown in Table 1A, it was found that pinholes were generated at a molding depth of 3.3 mm or more in the battery packaging material of Comparative Example 1A where a coloring pigment was used in a PET film, and pinholes were generated at a molding depth of 3.5 mm or more in the battery packaging material of Comparative Example 2A where a coloring pigment was used in an adhesive agent, whereas in the battery packaging material of Example 1A where a coloring dye was used, pinholes were generated only at a molding depth of more than 3.8 mm, and thus higher moldability was exhibited as compared to Comparative Example 1A and Comparative Example 2A.

It was found that the dielectric breakdown voltage decreased at a molding depth of 3.2 mm in the battery packaging material of Comparative Example 1A and at a molding depth of 3.3 mm in the battery packaging material of Comparative Example 2A, whereas in Example 1A, the dielectric breakdown voltage decreased only at a molding depth of more than 3.7 mm, and thus a superior insulation quality was exhibited as compared to Comparative Example 1A and Comparative Example 2A. Further, it was found that in the battery packaging material of Comparative Example 2A, color unevenness occurred at the molded corner portion, leading to a change in color tone.

From the above results, it is apparent that when a coloring dye is used as a discrimination mark, the coloring is recognizable from the outside, and serves as a discrimination mark difficult to forge, and superior moldability and a superior insulation quality are exhibited as compared to a case where a coloring pigment is used as a discrimination mark.

1-2. Production of Battery Packaging Material of Second Aspect of Invention

Examples 1B to 4B and Comparative Examples 1B to 4B

<Production of Battery Packaging Material>

Both surfaces of an aluminum foil (thickness: 30 μm) were subjected to a chemical conversion treatment, and a stretched nylon film (thickness: 15 μm) was bonded to one of the chemical conversion-treated surfaces with a polyester-based adhesive agent interposed therebetween by a dry lamination method in such a manner that the thickness of an adhesive agent layer was about 3 μm. Next, acid-modified polypropylene (thickness: 15 μm)/polypropylene (thickness: 15 μm) was melt-extruded to the other chemical conversion-treated surface to obtain a laminate including a stretched nylon film, a polyester-based adhesive agent, aluminum with both surfaces subjected to a chemical conversion treatment, acid-modified polypropylene and polypropylene. The chemical conversion treatment was performed in the following manner: an aqueous solution including a phenol resin, a chromium fluoride compound and phosphoric acid was applied as a treatment liquid using a roll coating method, and baked under the condition of a film temperature of 180° C. or higher. The applied amount of chromium was 10 mg/m$^2$ (dry weight).

Next, in Examples 1B to 4B and Comparative Examples 1B to 3B, inks having composition as described in Table 1B were sequentially printed on the surface of the stretched nylon film in the obtained laminate by a gravure coating method, so that a first decorative layer (thickness: 4 μm) and a second decorative layer (thickness: 4 μm) were sequentially formed to prepare a laminate including a second decorative layer, a first decorative layer, a stretched nylon film, a polyester-based adhesive agent, aluminum with both surfaces subjected to a chemical conversion treatment, acid-modified polypropylene and polypropylene in this order. The obtained laminates were left standing at 40° C. for 3 days to be aged, thereby obtaining battery packaging materials of Examples 1B to 4B and Comparative Examples 1B to 3B.

In Comparative Example 4B, an ink having composition as described in Table 1B was printed on the surface of the stretched nylon film in the obtained laminate by a gravure coating method to obtain a laminate with one decorative layer (a laminate including a decorative layer, a stretched nylon film, a polyester-based adhesive agent, aluminum with both surfaces subjected to a chemical conversion treatment, acid-modified polypropylene and polypropylene in this order). The obtained laminate was left standing at 40° C. for 3 days to be aged, thereby obtaining a battery packaging material of Comparative Example 4B.

[Evaluation of Concealment Property]

The battery packaging materials obtained in Examples 1 to 4B and Comparative Examples 1B to 4B were uniaxially stretched by 100%, and then observed from the second decorative layer side to visually check whether the base was exposed or not. Samples in which the base was exposed were evaluated as having a low concealment property (x), and samples in which the base was not exposed were evaluated as having a high concealment property (◯). The results are shown in Table 1B.

ethanol, followed by observing the surface state. Samples in which there was a change in the surface were evaluated as having low electrolytic solution resistance (x), and samples in which there was no change in the surface were evaluated as having high electrolytic solution resistance (◯). The results are shown in Table 1B.

TABLE 1B

| | | Decorative layer | | | | Evaluation | | | |
|---|---|---|---|---|---|---|---|---|---|
| | | Thickness | Blank pigment (% by mass) | Matting agent (% by mass) | Resin (% by mass) | Concealment property after molding | Adhesion after molding | Surface insulation quality | Electrolytic solution resistance |
| Example 1B | Second decorative layer | 4 μm | 0 | 20 | 80 | ◯ | ◯ | ◯ | ◯ |
| | First decorative layer | 4 μm | 18 | 2 | 80 | | | | |
| Example 2B | Second decorative layer | 4 μm | 15 | 15 | 70 | ◯ | ◯ | ◯ | ◯ |
| | First decorative layer | 4 μm | 22 | 8 | 70 | | | | |
| Example 3B | Second decorative layer | 4 μm | 5 | 15 | 80 | ◯ | ◯ | ◯ | ◯ |
| | First decorative layer | 4 μm | 15 | 0 | 85 | | | | |
| Example 4B | Second decorative layer | 4 μm | 15 | 5 | 80 | ◯ | ◯ | ◯ | ◯ |
| | First decorative layer | 4 μm | 0 | 15 | 85 | | | | |
| Comparative Example 1B | Second decorative layer | 4 μm | 0 | 20 | 80 | ◯ | x | ◯ | ◯ |
| | First decorative layer | 4 μm | 40 | 10 | 50 | | | | |
| Comparative Example 2B | Second decorative layer | 4 μm | 10 | 40 | 50 | ◯ | ◯ | ◯ | x |
| | First decorative layer | 4 μm | 18 | 2 | 80 | | | | |
| Comparative Example 3B | Second decorative layer | 4 μm | 50 | 10 | 40 | ◯ | ◯ | Δ | x |
| | First decorative layer | 4 μm | 0 | 20 | 80 | | | | |
| Comparative Example 4B | Decorative layer | 8 μm | 9 | 11 | 80 | Δ | ◯ | ◯ | ◯ |

[Evaluation of Adhesion]

The battery packaging materials obtained in Examples 1 to 4B and Comparative Examples 1 to 4B were uniaxially stretched by 100%, followed by visually checking whether or not peeling, floating, cracking and so on occurred in the second decorative layer and the first decorative layer. Samples in which peeling, floating, cracking and so on occurred were evaluated as having low adhesion (x), and samples in which peeling, floating, cracking and so on did not occur were evaluated as having high adhesion (◯). The results are shown in Table 1B.

[Evaluation of Surface Insulation Quality]

The surface resistance value of the second decorative layer situated on the outermost layer of the battery packaging material obtained in each of Examples 1B to 4B and Comparative Examples 1B to 4B was measured at 22° C. and a relative humidity of 40% using Hiresta UP "product name, manufactured by Mitsubishi Chemical Corporation." The evaluation criteria are as follows.

◯: The surface insulation quality is high with the surface resistance value being $10^6$ Ω/sq. or more.

Δ: The surface insulation quality is slightly low with the surface resistance value being $10^4$ Ω/sq. or more and less than $10^6$ Ω/sq.

x: The surface insulation quality is low with the surface resistance value being less than $10^4$ Ω/sq.

[Evaluation of Electrolytic Solution Resistance]

An electrolytic solution (composition of electrolytic solution: a mixed liquid of ethylene carbonate, diethyl carbonate and dimethyl carbonate (1:1:1 in terms of a volume ratio) which contains 1 M $LiPF_6$) was added dropwise to the surface of the second decorative layer of the battery packaging material obtained in each of Examples 1B to 4B and Comparative Examples 1B to 4B, the battery packaging material was left standing under an environment at 25° C. and a humidity of 50% for 1 hour, and the electrolytic solution was then wiped out with a waste cloth soaked with ethanol, followed by observing the surface state. Samples in which there was a change in the surface were evaluated as having low electrolytic solution resistance (x), and samples in which there was no change in the surface were evaluated as having high electrolytic solution resistance (◯). The results are shown in Table 1B.

The notes in Table 1B are shown below.

Black pigment: carbon black (particle size: about 0.3 to 0.4 μm)

Matting agent: silica particles (particle size: about 0.1 to 3.0 μm)

Resin: polyester polyol (80% by mass) and isocyanate-based curing agent (20% by mass)

As is evident from the results shown in Table 1B, the battery packaging materials of Examples 1B to 4B where the decorative layer contained a predetermined amount of a pigment and a matting agent, and the ratios of resins in the first decorative layer and the second decorative layer were each 70% by mass or more were excellent in post-molding concealment property and adhesion, and also excellent in surface insulation quality and electrolytic solution resistance. On the other hand, the battery packaging material of Comparative Example 1B where the ratio of a resin in the first decorative layer was 50% by mass had low adhesion. The battery packaging material of Comparative Example 2B where the ratio of a resin in the second decorative layer situated on the outermost layer was 50% by mass had low electrolytic solution resistance although the second decorative layer contained a matting agent. In the battery packaging material of Comparative Example 3B where the ratio of a resin in the second decorative layer situated on the outermost layer was 40% by mass or less, not only electrolytic solution resistance but also a surface insulation quality was deteriorated probably because the ratio of a black pigment in the second decorative layer was increased for improving the concealment property. In the battery packaging material of Comparative Example 4B where one decorative layer having composition corresponding to combined composition of the first decorative layer and the second decorative layer formed in Example 1B was provided, the post-molding concealment property was insufficient. When only one layer was formed as in Comparative Example 4B, the matting effect of the matting agent was also low.

DESCRIPTION OF REFERENCE SIGNS

1: Base material layer
2: Adhesive layer
3: Metal layer
4: Sealant layer
5: Adhesive layer
6: Decorative layer
6a: First decorative layer
6b: Second decorative layer

The invention claimed is:

1. A battery packaging material comprising a laminate in which at least a base material layer, an adhesive layer, a metal layer and a sealant layer are laminated in this order, wherein
at least one of the base material layer or the adhesive layer contains a dye, and
the dye is dissolved or dispersed in a resin film forming the base material layer or in an adhesive agent forming the adhesive layer, wherein the dye is at least one selected from the group consisting of a nitro dye, an azo-based dye, a stilbene dye, a carbonium dye, a quinoline dye, a methine dye, a thiazole dye, a quineimine dye, an anthraquinone dye, an indigoid dye and a phthalocyanine dye.

2. The battery packaging material according to claim 1, wherein a color from the dye forms a discrimination mark.

3. The battery packaging material according to claim 1, wherein the base material layer contains the dye.

4. The battery packaging material according to claim 1, wherein the concentration of the dye in the base material layer is 1 to 50% by mass.

5. A battery packaging material comprising a laminate in which at least a decorative layer, a base material layer formed from a resin film, a metal layer and a sealant layer are laminated in this order, wherein
the decorative layer includes at least a first decorative layer and a second decorative layer in this order from the base material layer side,
the decorative layer contains a colorant and a matting agent,
the first decorative layer and the second decorative layer are each formed from a two-liquid curable resin, and
the ratios of resins in the first decorative layer and the second decorative layer are each 60% by mass or more.

6. The battery packaging material according to claim 5, wherein the ratio of the matting agent in the first decorative layer is 1 to 30% by mass.

7. The battery packaging material according to claim 5, wherein the first decorative layer contains 1 to 30% by mass of a pigment as the colorant.

8. The battery packaging material according to claim 5, wherein the ratio of the resin in the first decorative layer is 65% by mass or more.

9. The battery packaging material according to claim 5, wherein the ratio of the matting agent in the second decorative layer is 1 to 30% by mass.

10. The battery packaging material according to claim 5, wherein the second decorative layer contains 1 to 30% by mass of a pigment as the colorant.

11. The battery packaging material according to claim 5, wherein the ratio of the resin in the second decorative layer is 65% by mass or more.

12. The battery packaging material according to claim 5, wherein the second decorative layer is an outermost layer, and the first decorative layer and the second decorative layer are adhered.

13. The battery packaging material according to claim 5, wherein the colorant is a black pigment.

14. The battery packaging material according to claim 1, wherein the metal layer is formed of an aluminum foil.

15. The battery packaging material according to claim 1, which is a packaging material for a secondary battery.

16. A battery comprising a battery element which includes at least a positive electrode, a negative electrode and an electrolyte, the battery element being stored in the battery packaging material according to claim 1.

17. A battery comprising a battery element which includes at least a positive electrode, a negative electrode and an electrolyte, the battery element being stored in the battery packaging material according to claim 5.

18. The battery packaging material according to claim 1, wherein the dye is a non-pigment colorant.

* * * * *